United States Patent [19]

Hoover et al.

[11] Patent Number: 4,524,546
[45] Date of Patent: Jun. 25, 1985

[54] ROLL PROFILE GAUGE

[76] Inventors: Bradley R. Hoover, 661 Schultz, Hamilton, Ohio 45013; Karl T. Bagdal, 2014 Erie Ave., Middletown, Ohio 45042

[21] Appl. No.: 501,644

[22] Filed: Jun. 6, 1983

[51] Int. Cl.³ .............................................. B24B 49/04
[52] U.S. Cl. ..................................... 51/165 R; 51/49
[58] Field of Search ................. 51/165 R, 165, 72, 49, 51/106 R

[56] References Cited

U.S. PATENT DOCUMENTS

| | | | |
|---|---|---|---|
| 2,019,066 | 10/1935 | Balsiger | 51/165 |
| 2,465,002 | 3/1949 | Aller | 73/37.5 |
| 3,353,302 | 11/1967 | Lowy | 51/49 |
| 3,391,497 | 7/1968 | Parrella | 51/165 R |
| 3,456,394 | 7/1969 | Welsh | 51/49 |
| 3,568,372 | 3/1971 | Asano | 51/165 R |
| 3,744,135 | 7/1973 | Gebel | 33/169 |

OTHER PUBLICATIONS

"Gaging Sheet Steel Work Rolls", *Manufacturing Engineering*, Apr. 1978.
"Armco Devises a Roll-Grinding Gage for To-The-Tee Shape Measurement", *Metal Producing*, Apr. 1978.

*Primary Examiner*—Harold D. Whitehead

[57] ABSTRACT

The surfaces of worn and ground rolls are profiled by an electronic processor based gauge which is easily mounted on a roll grinding machine. A fluidic sensor within the gauge determines the distance to the roll surface. The change in roll diameter is detected by changes of air gap between sensor and roll surface. The electronic processor automatically produces a linear scale of the roll profile on a chart recorder. Two fixed spherical elements are mounted on a V-shaped frame member which contact the roll.

25 Claims, 17 Drawing Figures

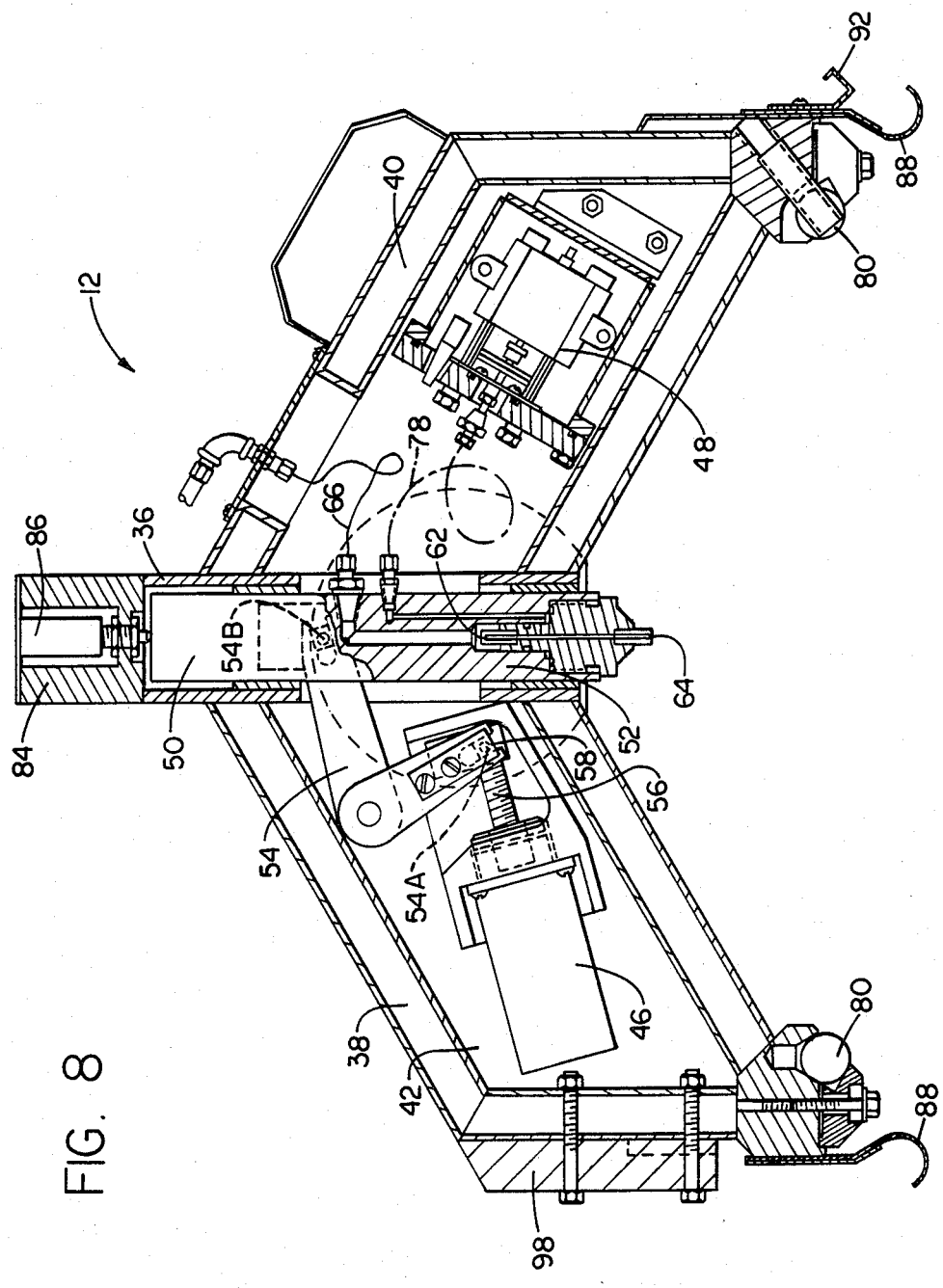

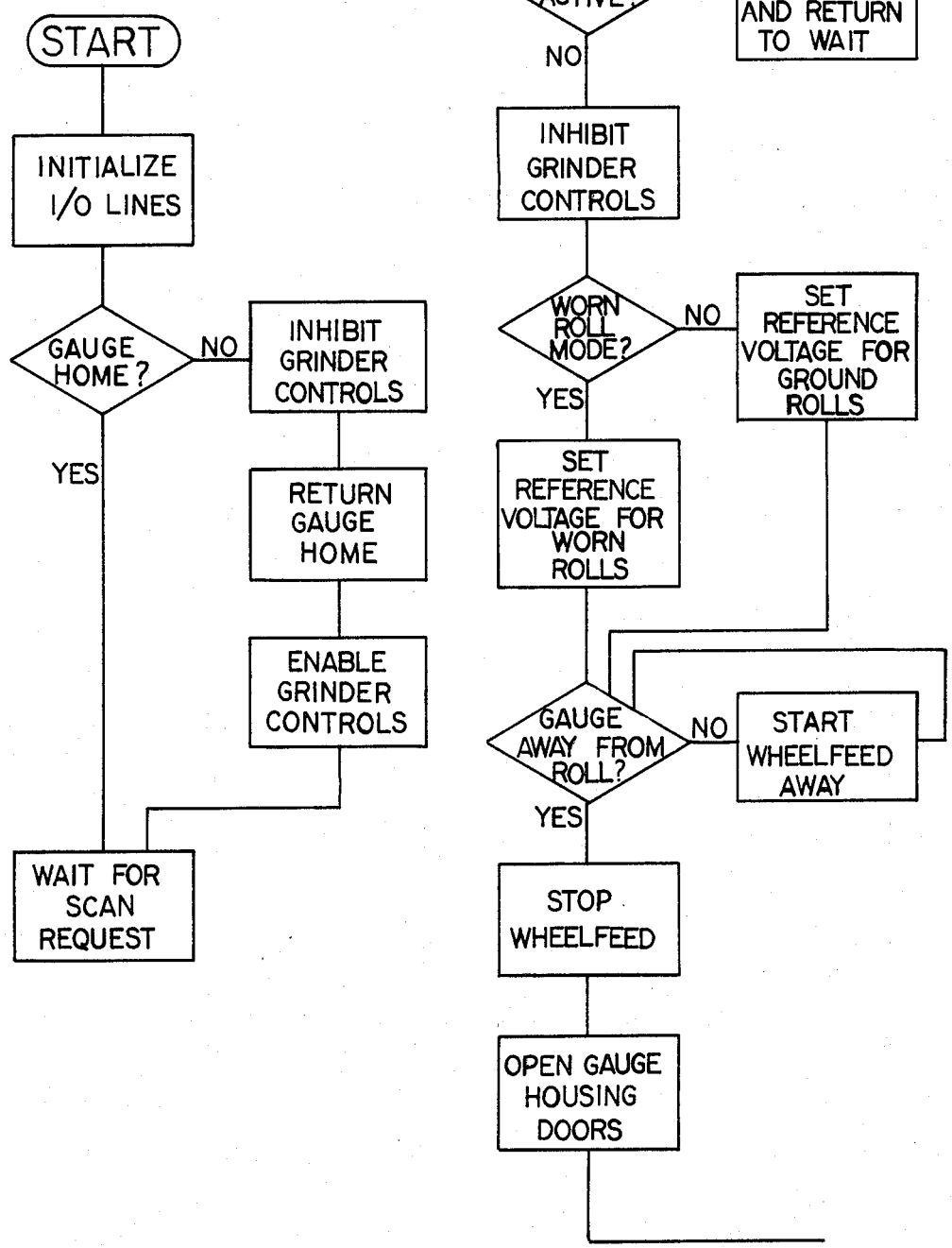

ROLL PROFILE GAUGE

TECHNICAL FIELD

The invention relates in general to gauging devices, and more particularly to an improved pneumatic crown-taper roll measuring gauge for use on conventional roll grinding machines to improve resolution, accuracy and ease of profile gauging steel mill work rolls and back-up rolls to improve the quality of hot and cold rolled steel.

BACKGROUND ART

Perhaps the most essential parts of the rolling mill are the rolls, as they control the reduction and shaping of the metal. A plane-surface or cylindrically-bodied roll is used (in pairs) for rolling sheets and plates, while for bars and shapes, grooves of suitable design are turned in the roll bodies. Each roll includes a body portion, or the part on which the rolling is done, and is designed so as to produce the desired gauge and profile.

It has been found during operation of a rolling mill that best results are obtained if rolls are periodically removed and checked for wear, the bodies ground, and the newly ground rolls replaced in the rolling mill. However, the art has experienced problems in developing satisfactory roll calipers of a manageable size and reasonable cost which ascertain the surface profile of both worn and newly ground rolls of various diameters. Calipers in the past have required too much manual operation and too much time. Exemplary of the many prior art patents showing gauging devices are U.S. Pat. Nos. 2,019,066 (Balseger); 2,465,002 (Aller) and 3,744,135 (Gebel).

DISCLOSURE OF THE INVENTION

According to the invention, there is provided an improved roll profile gauge which may be installed on a roll grinder and may be controlled by a programmable signal processor to produce a chart recording which has linear scale to profile the surface of the roll trasversed by the gauge. The gauge, which uses a sensor to measure distance from the roll, measures both worn and ground rolls and rolls of varying diameter.

In operation, the sensor is positioned at an initial distance from the surface of the roll, which depends on whether the roll is a newly ground roll or a worn roll, by way of a stepping motor, and is then scanned down the length of the roll. Changes in the distance from the sensor to the roll surface are proportional to changes in the roll diameter. The proportionality constant is a non-linear function of the nominal roll diameter and is calculated from the number of steps of the stepping motor required to position the sensor.

A pressure transducer converts the back pressure of the sensor, due to its distance from the roll surface, to a resistance, and a current flowing through this resistance generates a voltage signal. In order to provide the required resolution in the measurement of this voltage, the difference between the pressure transducer signal and a reference voltage generated by the programmable signal processor is measured, and the programmable signal processor sets the value of the reference voltage depending on which mode, worn roll or ground roll, the sensor is in.

The output of the sensor is a non-linear function of the distance from the surface of the roll to the sensor. The programmable signal processor performs the necessary calculations to linearize this function and produces a chart recording which has a linear scale. The chart recording of the roll profile readily shows the condition of the roll surface, and a decision may be immediately made as to whether or not the roll meets specification.

The automatic, processor-controlled, "grinder mounted", roll profiling gauge of the present invention improves the resolution, accuracy and ease of profile gauging hot and cold strip work rolls and back-up rolls, resulting in improved gauge control of hot and cold rolled steel and to automate the gauging process so that less time and effort are spent in gauging rolls. The gauge may be used on a wide range of roll diameters and is not influenced by variations introduced by movement of the grinder carriage along the guiding surfaces on the bed. The small gauge is easily stored, and is extremely accurate.

Although the gauge of the present invention is specifically described for steel processing, it will be understood that the invention has utility for profiling the surface of rolls in other industries such as aluminum and paper.

BRIEF DESCRIPTION OF THE DRAWINGS

FIG. 8 is an upright cross sectional view through the gauge frame taken on line 8—8 of FIG. 7.

FIG. 13 is a flow diagram showing the processor power-up sequence.

FIGS. 14A through 14C are flow diagrams illustrating the processing of the roll profile gauge of the present invention.

DETAILED DESCRIPTION

Figure 1:
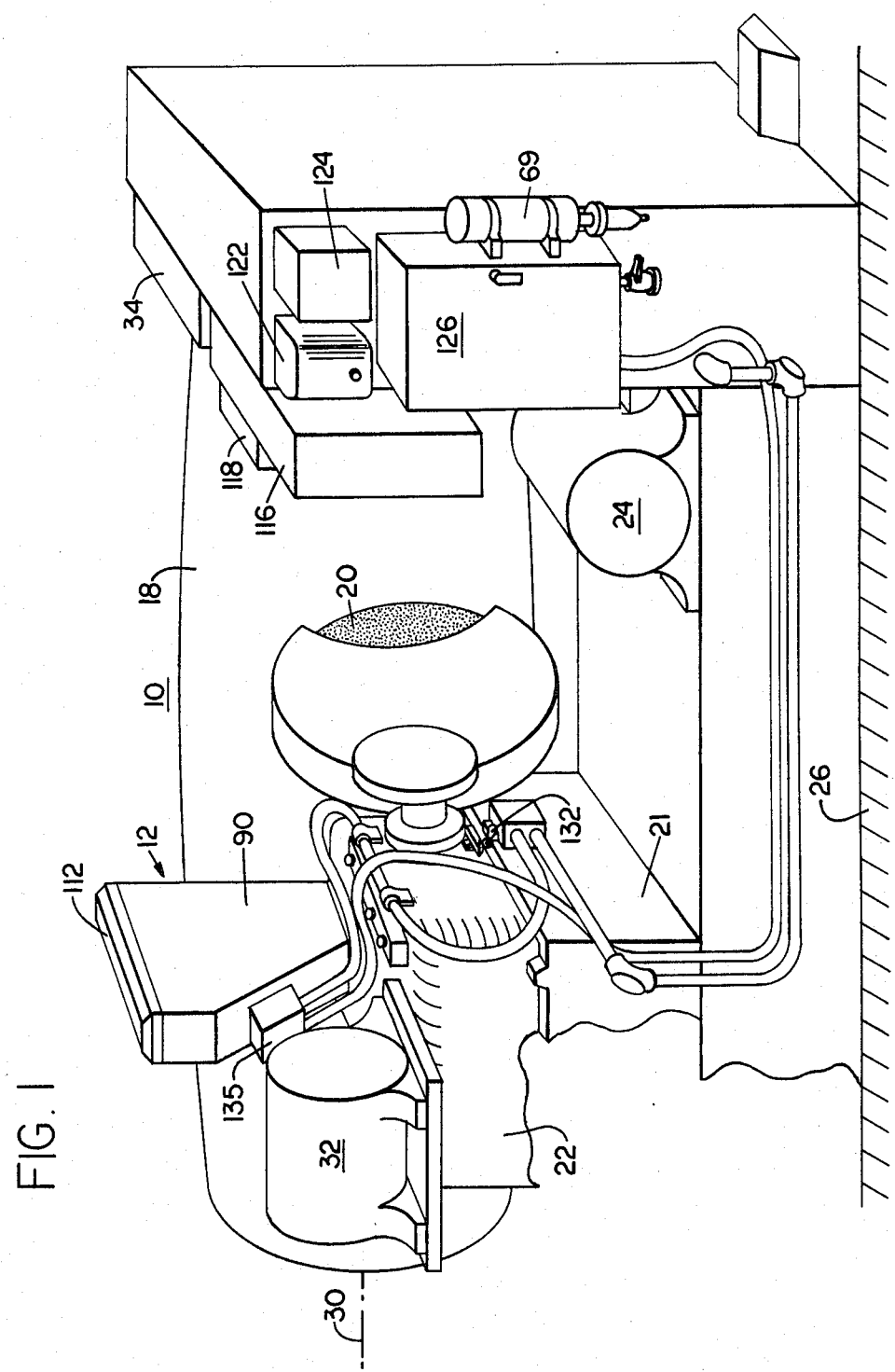
FIG. 1 is an overall diagrammatic, schematic, perspective view of the roll profile gauge of the present invention as mounted on a roll grinder.
Figure 2:
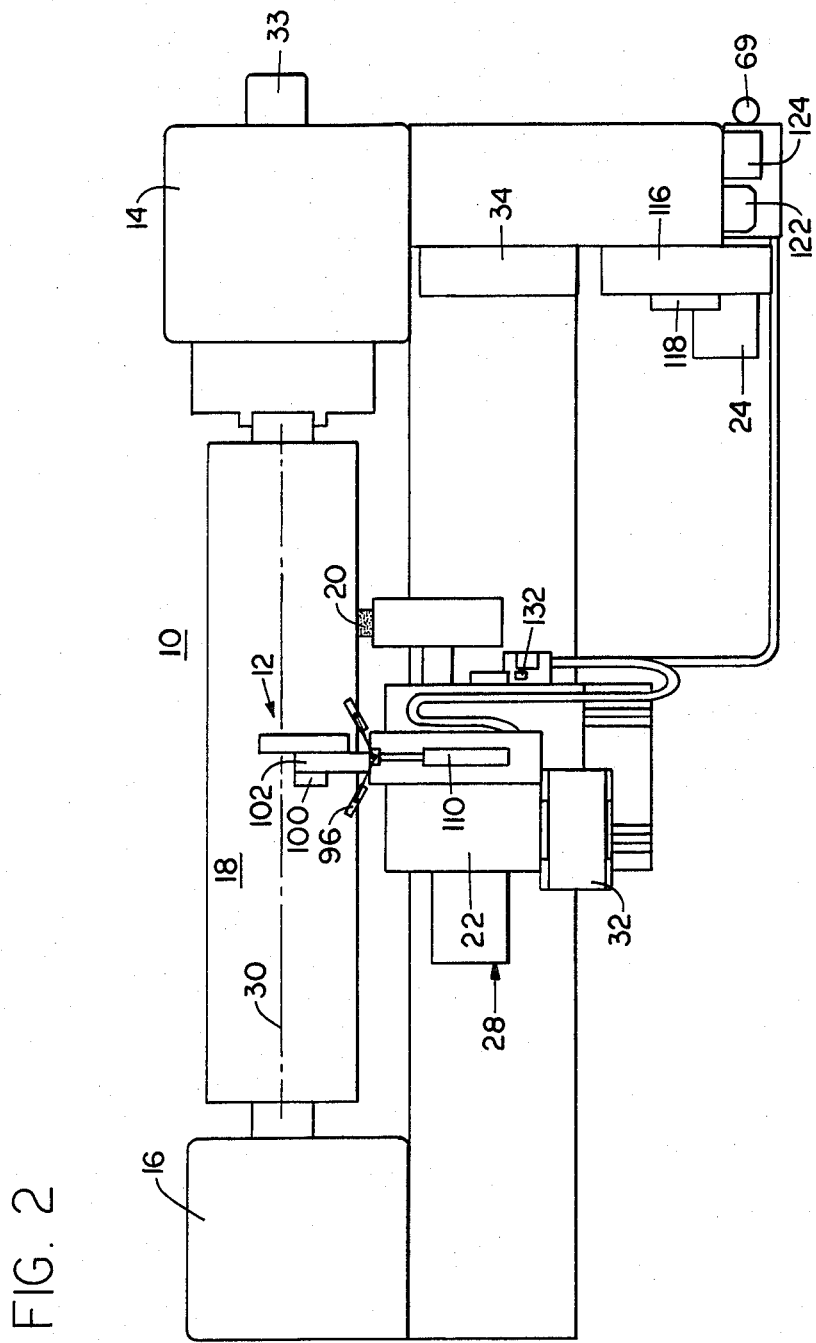
FIG. 2 is a schematic plan view of a conventional roll grinder which incorporates the roll profile gauge of the present invention.

Turning to the drawings, and in particular to FIGS. 1 and 2, a conventional roll grinder 10 incorporating the roll profile gauge 12 of the present invention is shown. As can be seen, the roll grinder 10 is provided with a head stock 14 and tail stock 16 for rotatively mounting a roll 18 to be ground. A grinding wheel 20 is mounted on a grinding wheel housing 22. Means, such as the traverse motor 24, are provided to traverse the carriage 21 of grinder 10 longitudinally of the roll 18 on a longitudinal bed 26. Similarly, means such as the motor 28 are provided to shift the grinding wheel housing 22 of the grinder 10 toward and away from the roll 18 in a direction substantially perpendicular to the roll axis 30. Suitable means, such as a motor 32, operate the grinding wheel, and means, such as the head stock motor 33, control the rotation of the roll 18. The operation of the roll grinder is controlled by controls in the control cabinet 34.

Figure 7:
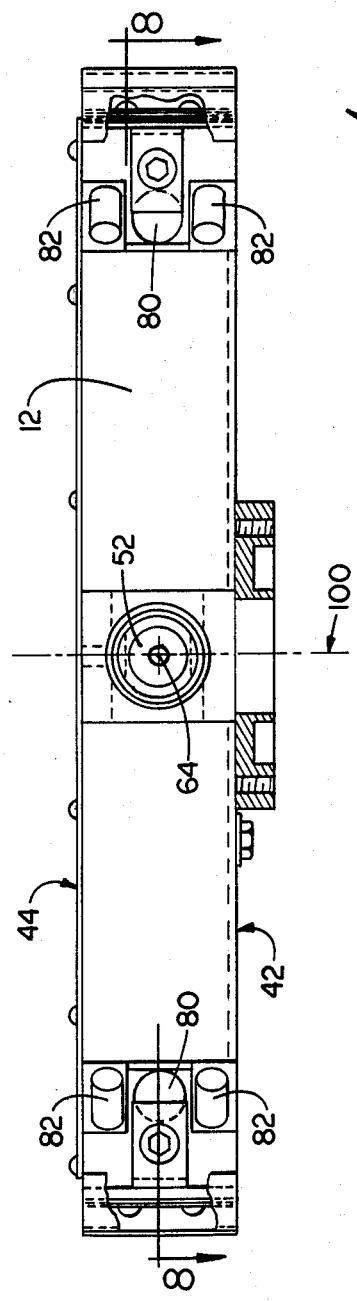
FIG. 7 is an elevational view showing the gauge frame.

The roll profile gauge 12 of the present invention, which is best seen in FIGS. 7 and 8, is V-shaped and comprises a block 36 with laterally extending tubular frame members 38 and 40 of rectangular cross section. The structure is provided with a pair of plates 42 and 44. In FIG. 8, the plate 44 has been removed and it will be seen that a stepping motor 46 is fixed to the plate 42 within the confines of the frame 38. A transducer 48 is mounted on the cover plate 42 within the confines of the frame 40. The purpose of the stepping motor 46 and the transducer 48 will be described hereinafter.

The block 36 is provided with an axial bore 50 within which is slidably mounted a sensor 52. While a fluidic sensor is described, it will be understood that other sensors may be used, such as a capacitive sensor. Movement of the fluidic sensor 52 in the bore 50 is controlled by stepping motor 46, which is connected to the sensor by means of lever actuation 54. In operation, the stepping motor 46 rotates a threaded shaft 56, causing a nut 58 to move back and forth thereon, depending upon the direction of rotation of the shaft 46. One end 54a of the lever actuation 54 is secured to the nut 58, while the other end 54b thereof is secured to the rear of the sensor 52.

Figure 6:
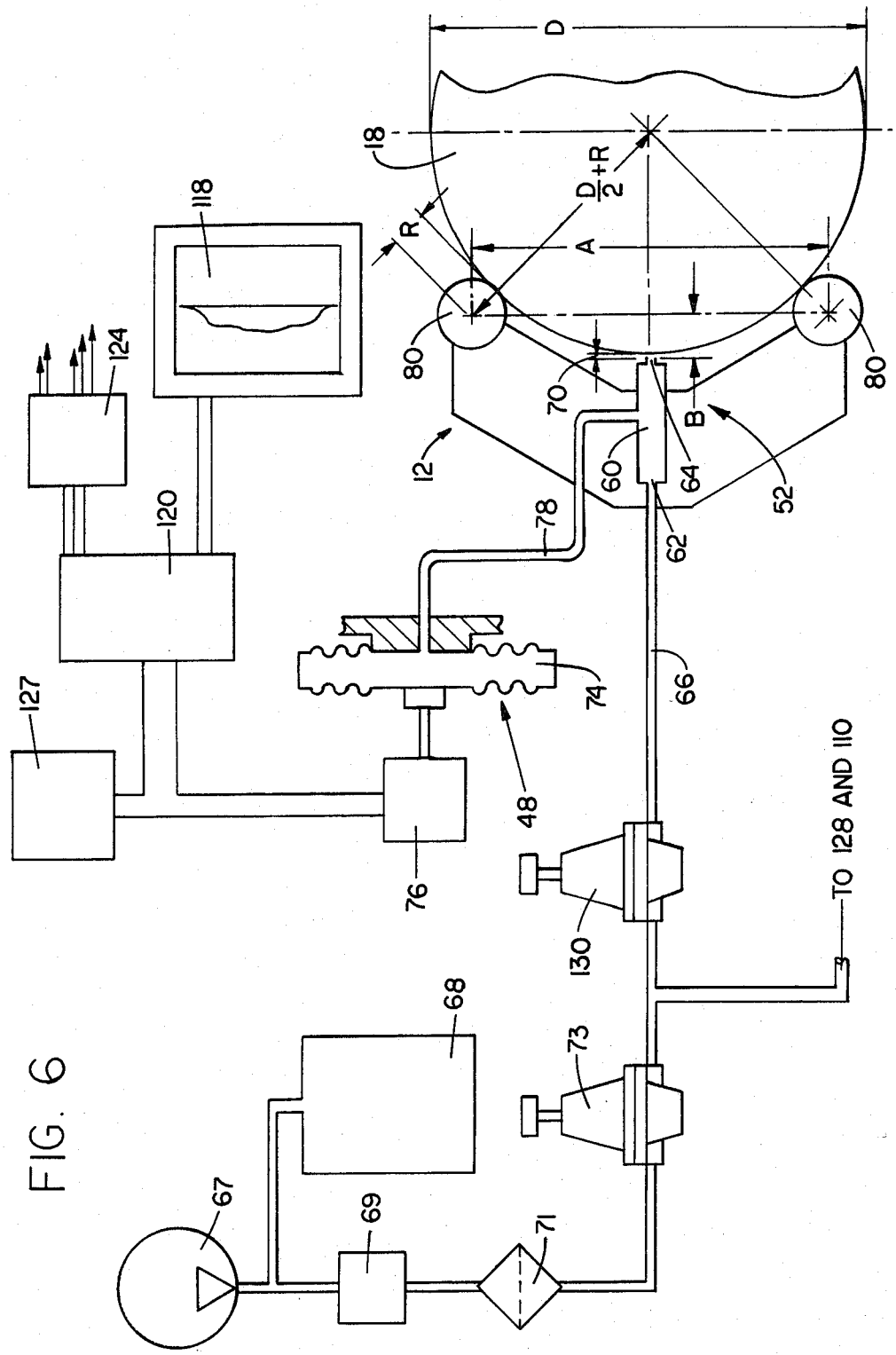
FIG. 6 is a system schematic view showing the sensor, sensor mount, pneumatic system, pressure transducer, processor and chart recorder.
Figure 9:
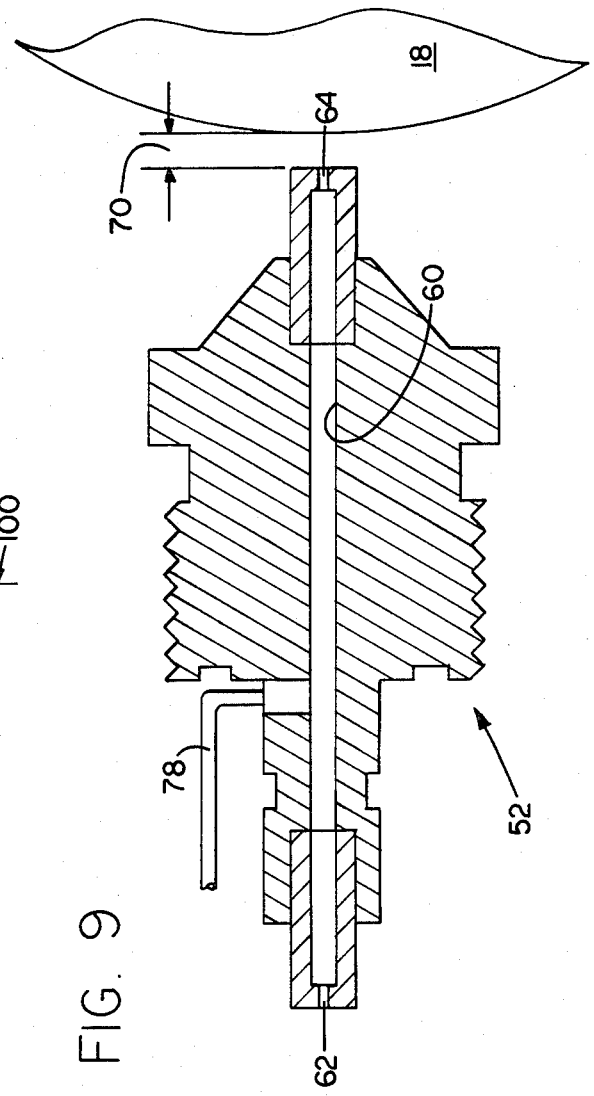
FIG. 9 is an enlarged cross sectional view of the fluidic sensor.

As can be seen in FIGS. 6 and 9, the sensor 52 contains an axial bore 60, which is provided with an inlet orifice 62 and outlet orifice 64. The inlet orifice is connected by means of the supply line 66 to a source of clean, dry, instrument-quality fluid, such as air, under a desired pressure, which is regulated by the regulator 130 from a compressor 67 and tank 68. The outlet orifice 64 is variable, in that the amount of air permitted to flow is governed by the gap 70 from the end of the second orifice 64 to the surface of the roll 18, as will be more fully explained hereinafter.

A sensitive pressure measuring device, such as the transducer 48, is connected to the bore 60 between the inlet and outlet orifices 62 and 64, respectively, so that when the air gap 70 changes, the pressure in bore 70 changes and it can be detected by the transducer 48. In practice, the transducer 48 may include a bellows 74, as best seen in FIG. 6, whose deflection is sensed by a linear motion transducer 76. The transducer 48, comprising the bellows 74 and linear transducer 76, may, of course, be combined in a unit. A suitable unit is Model P-12, manufactured by Unimeasure of Pasadena, Calif. The transducer 48 is connected to the bore 60 by means of the supply line 78.

As best seen in FIG. 8, the gauge head is provided with spherical elements 80 which are adapted to contact and slide along the surface of the roll 18 being gauged and to provide a reference location for the fluidic sensor 52. The spherical elements 80 are preferably stationary, but each may be adjusted by rotation if a surface thereon should become flat through use.

As best seen in FIG. 7, proximity sensors 82 are provided on either side of the spherical elements 80. As will be more fully explained hereinafter, the proximity sensors 82 aid in properly positioning the roll profile gauge 12 with respect to the surface of the roll 18 being gauged. In practice, the proximity sensors 82 are used to detect whether the spherical elements 80 are about to fall off of the working surface of the roll 18 when the gauge 12 is at the head stock end 14 or tail stock end 16 of the roll 18.

Mounted on the rear of the central block 36 behind the fluidic sensor 52 is the housing 84 which contains a switch 86 for sensing the retracted position of the fluidic sensor 52.

Adjacent the spherical elements 80 at the forwardmost corners of the plates 42 and 44 are spring bumpers 88 which act as protective bumpers for the spherical elements 80 and the roll 18 being measured. As will be more fully explained hereinafter, as the gauge 12 moves out of its housing 90, it is usually in an attitude in which the upper spherical element 80 will strike the roll 18, if not precluded from doing so by the spring bumpers 88.

Mounted in conjunction with the upper spring bumper 88 is a clip 92 which, as will be more fully explained hereinafter, engages a metal finger 94 inside the gauge enclosure 90 and causes the gauge 12 to rotate into an upright position. This assures that the gauge 12 is totally within the enclosure 90 so that the doors 96 may be closed.

Finally, weight 98 has been mounted at the bottom of the gauge frame members 38 to aid in keeping the gauge 12 in the proper position as the gauge 12 makes contact with the surface of the roll 18. The weight 98 overcomes the resistance of rotation of the gauge 12 caused by friction in the tapered roller bearings of the gauge axle 100.

Figure 3:
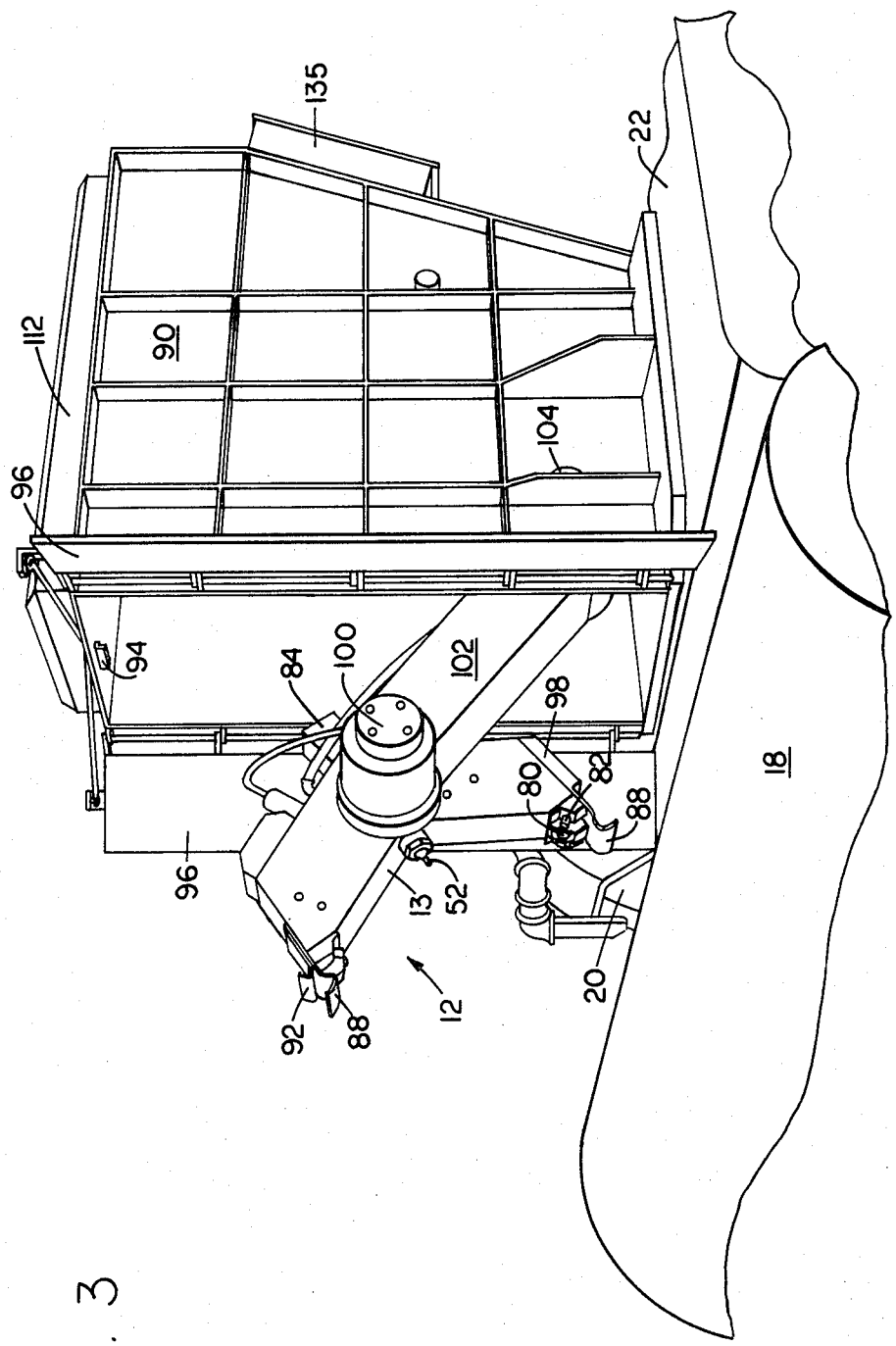
FIG. 3 is a perspective view of the roll profile gauge and housing therefor.
Figure 4:
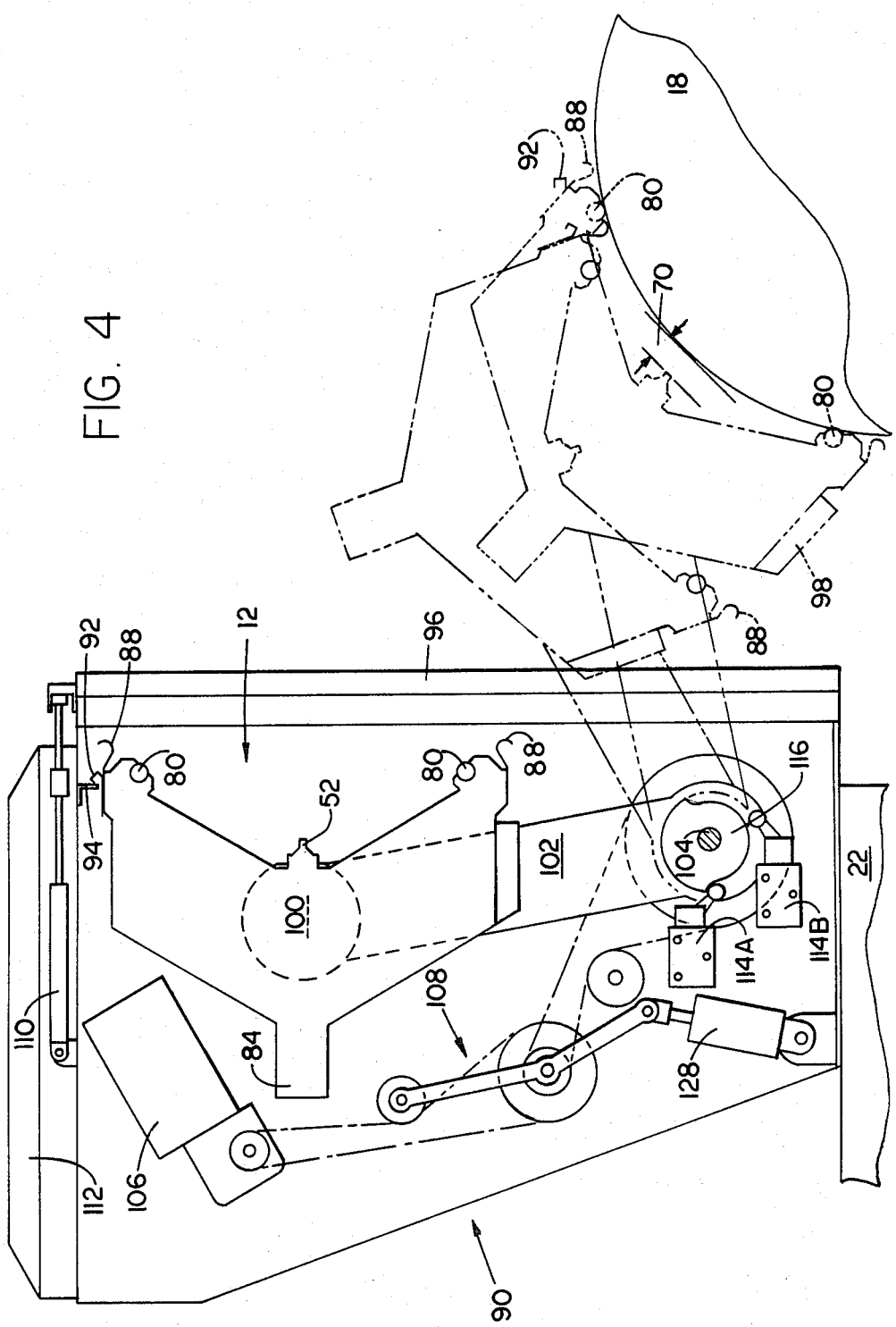
FIG. 4 is a schematic, side elevational view of the roll profile gauge housing, arm, gauge frame and drive system showing the arm in the stored and in the extended position.
Figure 5:
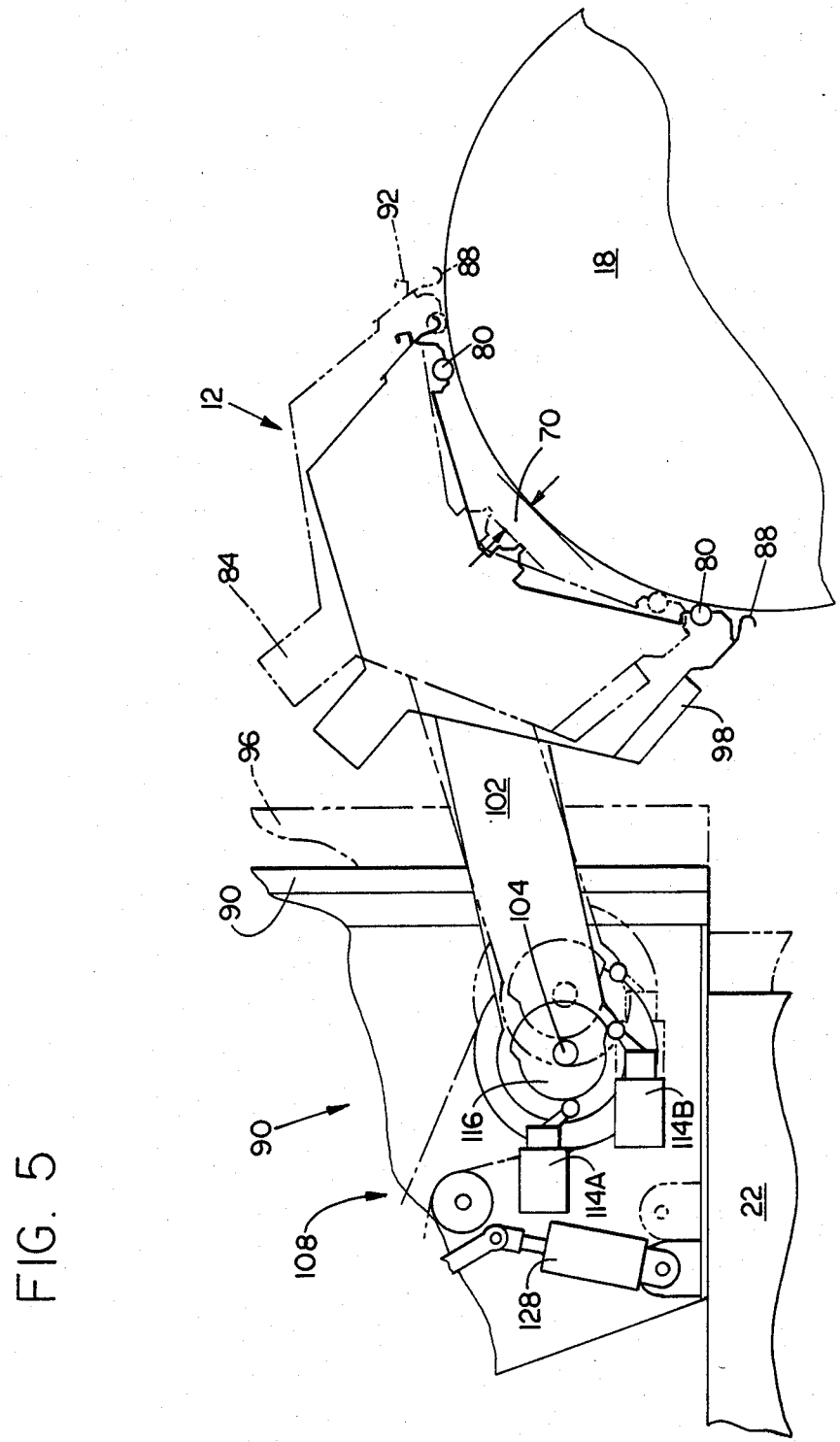
FIG. 5 is a view similar to FIG. 4, but showing the release of the arm-out switch when the spherical elements of the gauge frame are on the subject roll.

As best seen in FIG. 3, the gauge 12 is mounted in an enclosure 90 on top of the grinding wheel housing 22. The enclosure for the gauge 12 aids in keeping the gauge head 13 clean when not in use. Enclosure 90 also serves as a protective barrier for the gauge 12 in the event that the unit is struck during a roll loading or unloading. In practice, the enclosure 90 is secured to the grinding wheel housing 22 by weakened securement means so that the securement means break first should the gauge enclosure 90 be struck during the loading or unloading of a roll 18.

The gauge head 13 is pivotally secured on the gear arm 102 by means of the axle 100. The gauge arm 102 is pivotally mounted within the enclosure 90 by means of the axial pivot 104. Movement of the gauge arm 102 about the pivot 104 is controlled by the gear motor 106. A double reduction chain drive system 108 reduces the rotary speed of the motion of the gauge arm 102 and also provides a means to unload a portion of the weight of the gauge 12 from the roll 18 to reduce wear of spherical elements 80.

The arm 102 allows the gauge head 13 to be positioned with respect to the measured roll's center line 30. This is accomplished by rotating the arm 102 about the pivot 104. The pivot 100 then allows for rotation of the gauge head 13 so that both spherical elements 80 of the gauge head 13 may engage the surface of the roll 18.

Figure 11A:
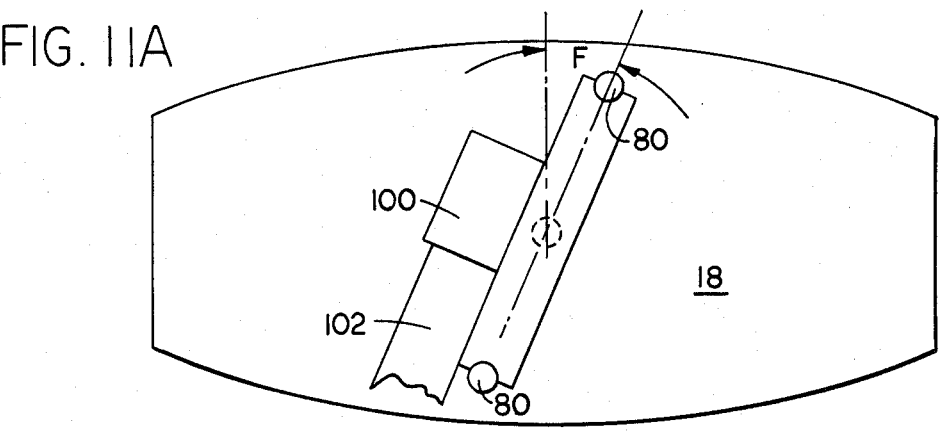
FIGS. 11A and 11B are diagrammatic elevational and plan views, respectively, showing gauge frame alignment on the roll.
Figure 11B:
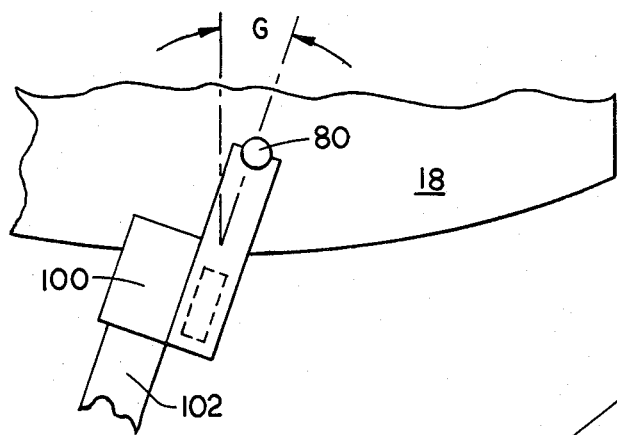

As can best be seen from FIGS. 11A and 11B, it is important that the gauge head 13 be maintained such that the angles F and G are small and do not vary during a measuring scan so as to insure that the gauge 12 is reading properly.

The weight 98 assists in maintaining the gauge head 13 in a proper orientation while approaching the roll 18. This prevents the upper spherical element 80 from hitting the roll 18 in a harsh manner. The weight 98 also assists in orienting the gauge head 13 when retracting into the enclosure 90.

An air cylinder equipment system 110 beneath the housing 112 on top of the enclosure 90 opens and closes the doors 96.

As will be more fully explained hereinafter, the gauge arm 102 maintains the alignment of the gauge head 13 with respect to the roll 18 during a gauging operation, and the movement thereof, which is controlled by the gear motor 106, is controlled by the gauge arm out switch 114B and retracted switch 114A, and off limit switch 114, which are actuated by the cam 116 on the mounting arm pivot 104.

The control system for the gauge 12 is located in the cabinet 116 adjacent to the roll grinder control cabinet 34. This cabinet contains a chart recorder 118, a programmable signal processor 120, isolation power transformer, push button controls, opto-isolators, which prevent high voltage interferring with the programmable signal processor 120, a constant current source 127 for gauging circuitry, a wiring harness (not shown) and strip terminal connector (not shown). As used herein and in the claims, the term "processor" relates to a microprocessor, computer, microcomputer or other circuit capable of handling inputs and outputs to control a plurality of peripheral devices in accordance with a pre-programmed routine.

The cabinet 122 houses the circuit contactors for applying power to the gear motor 106 that moves the gauge arm 102 in and out of the enclosure 90.

The cabinet 124 houses the contactors that de-activate certain circuits in the roller grinder 10 and allow the processor 120 to take command of the roll grinder 10 during a gauging or measuring cycle.

Finally, the compressor and translator cabinet 126 houses the air compressor 68, which supplies air to the fluidic sensor 52 and to the air cylinder door actuation equipment 110 that operates the doors 96 and the gauge weight unloading system 128, a translator (not shown), which generates the proper pulse train to operate the stepping motor 46 housed in the gauge frame member 38, thus causing the sensor 52 to extend or retract in the block 36, an air dryer and automatic drain valve 69, and an air filter 71 and regulator 73. In practice, the air dryer 69 is preferably a chemical air dryer which utilizes a deliquescent material in tablet form to dry the output air from the compressor 68. The automatic drain valve releases water captured at the bottom of the dryer 69 when the air pressure in the system drops to atmospheric pressure. After the air is dried, it passes through the air filter 71 to remove any dust or foreign particles that might clog the pneumatic orifices of the fluidic sensor 52. The air is then regulated by the regulator 73 from its maximum pump supply pressure via the pump 67 so that the air cylinder 128 that controls the weight unloading system is applying the proper force to the double reduction chain drive system 108, which always monitors tension on the chain drives, thus assuring that the total weight of gauge arm 102 and gauge head 13 are not carried by the roll 18. The desired pressure is also maintained for operating the air cylinder door actuating equipment 110, and to be supplied to the regulator 130, which is housed in the enclosure 135 on the rear of the enclosure 90.

The ability of the roll profile gauge 12 of the present invention to detect extremely small changes in roll diameter begins with the fluidic sensor 52 that senses variations of distance 70 of the surface of the roll 18 from the end of the fluidic sensor 52. If air is supplied to the inlet orifice 62 of the fluidic sensor 52 at a very constant pressure, and the distance or air gap 70 is reduced to zero (or the outlet orifice 64 is blocked off), the pressure in the bore 60 between the orifices 62 and 64 will be at the supply pressure from the regulator 130, since no air is flowing in this system. If the air gap 70 is made infinitely larger, which for most restrictor systems is any air gap 70 larger than 0.030 inches, the pressure in the bore 60 between the orifices 62 and 64 drops to some pressure slightly above atmospheric pressure. This pressure difference is the force necessary to overcome the restriction effects of the orifice 64.

Figure 10:
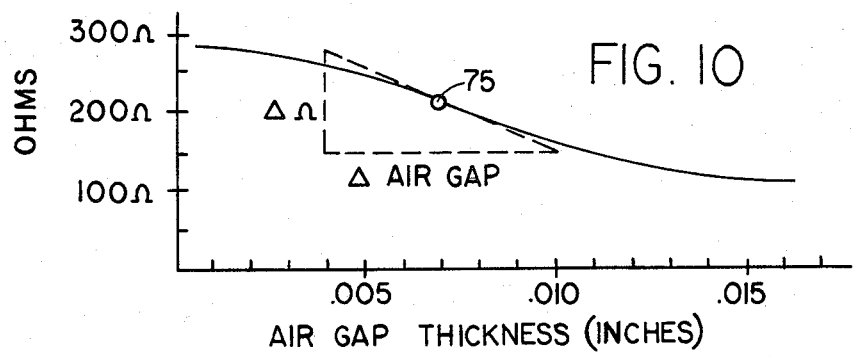
FIG. 10 is a graphical representation showing a typical response of the twin orifice fluidic sensor of the present invention.

The graph shown in FIG. 10 visually shows the effect of the size of the air gap 70 on the pressure in the bore 60 between the two orifices 62 and 64. It will be seen that the graph is nonlinear. The programmable signal processor 120 linearizes the signal from the transducer 48 and extends the range such that worn rolls can be gauged. With the air gap 70 set at the appropriate initial condition, there will be an associated pressure in the bore 60 between the orifices 62 and 64. This pressure is detected and converted by the transducer 48 that will output an electrical signal capable of eventually driving the chart recorder 118.

According to the present invention, a processor 120 accepts a voltage signal produced by the transducer 48. The processor 120 filters and conditions the signal before it reaches the chart recorder 118. This is done to eliminate noise from the signal and to make adjustments to the signal, since the pneumatic gauging system is a non-linear signal generating device. The processor 120 serves as the master controller of the roll grinder 10 during a measuring session. It also detects improper and unsafe situations and issues commands that will take protective actions.

The roll 18, spherical elements 80, and fluidic sensor 52, including the gap 70, all shown in FIG. 6, illustrate the trigonometric relationship between the diameter D of the roll 18, the distance A separating the spherical elements 80 of the gauge 12, the radius R of the spherical elements 80, and the dimension B for the depth below the surface of the roll 18 of the line joining the centers of the two spherical elements 80, from which the basic equation for determining how the change in gap 70 will relate to the change in diameter of the roll 18 is derived. The basic equation resulting therefrom is:

$$B = \frac{D}{2} - \sqrt{\left(\frac{D}{2} + R\right)^2 - \left(\frac{A}{2}\right)^2}$$

The processor 120 must have provisions for changing the amplification rate when different gross sizes of rolls 18 are measured. This is shown when the aforementioned equation is differentiated, which explains how the air gap 70 changes when the diameter D of the roll 118 changes.

$$\frac{d(b)}{d(D)} = \frac{1}{2}\left(1 - \frac{\frac{D}{2} + R}{\sqrt{\left(\frac{D}{2} + R\right)^2 - \left(\frac{A}{2}\right)^2}}\right)$$

Accordingly, it is clear that the diameter of the roll 18 influences the magnification of the signal generated for the chart recorder 118. To make sure that equal changes of diameter from an initial setting point for any diameter of roll 18 are treated equally at the chart recorder 118, the processor 120 has software routines that detect the basic size of roll 18 being measured and adjust the gain of the circuitry driving the pen of the chart recorder 118. In practice, the basic diameter of the roll 18 is measured by measuring the distance the fluidic sensor 52 is required to move out of the frame of the gauge 12 to come into its operating position at the roll surface.

Figure 12:
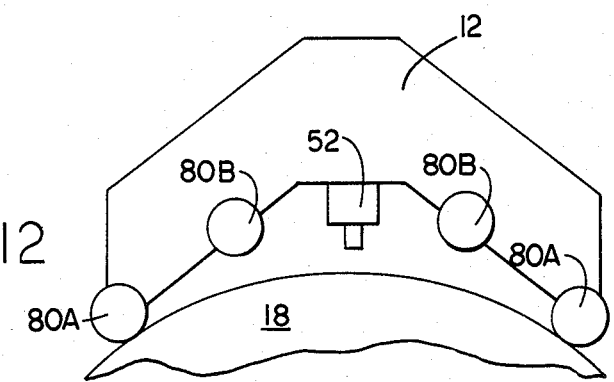
FIG. 12 is a diagrammatic representation showing a second embodiment of the gauge frame of the present invention incorporating four balls therein.

It will, of course, be realized that the arrangement of the spherical elements 80 on the head 13 of the gauge 12 may provide for extending the range of roll sizes which may be gauged. For example, as shown in FIG. 12, the spherical elements 80A will allow a large span to gauge large rolls, while the spherical elements 80B will provide a smaller span to gauge smaller rolls.

The roll profile gauge 12 of the present invention is capable of charting the surface profile of newly ground rolls as well as worn rolls. For the ground roll mode, only a portion of the graph shown in FIG. 10 is needed to cover the range required and the processor 120 linearizes this portion in two segments. However, for the worn roll mode, the gauge 12 must cover a larger span. This requires the utilization of a larger portion of the graph in FIG. 10 and sixteen segments are required to adequately linearize the response. The linearized signal is then multiplied by the magnification factor derived from the number of sensor positioning steps and averaged to provide a smooth output which ignores minor variations in the diameter of the roll 18.

The roll profile gauge 12 of the present invention is sensitive to out-of-round rolls. In practice, it has been found that actual rolls are generally out-of-round and must be rotated during measurement. The processor 120 averages the signals in order to remove the effect of out-of-roundness. Measuring the newly ground rolls while the roll 18 is rotating measures the average diameter as a function of position along the roll axis 30. Rotating the roll 18 should not be done in the case of worn rolls for two reasons. First, the roll roundness is not a problem due to the greater dynamic range. Also, the roughness of the worn roll increases frictional wear on the sperical elements 80.

Figure 14B:
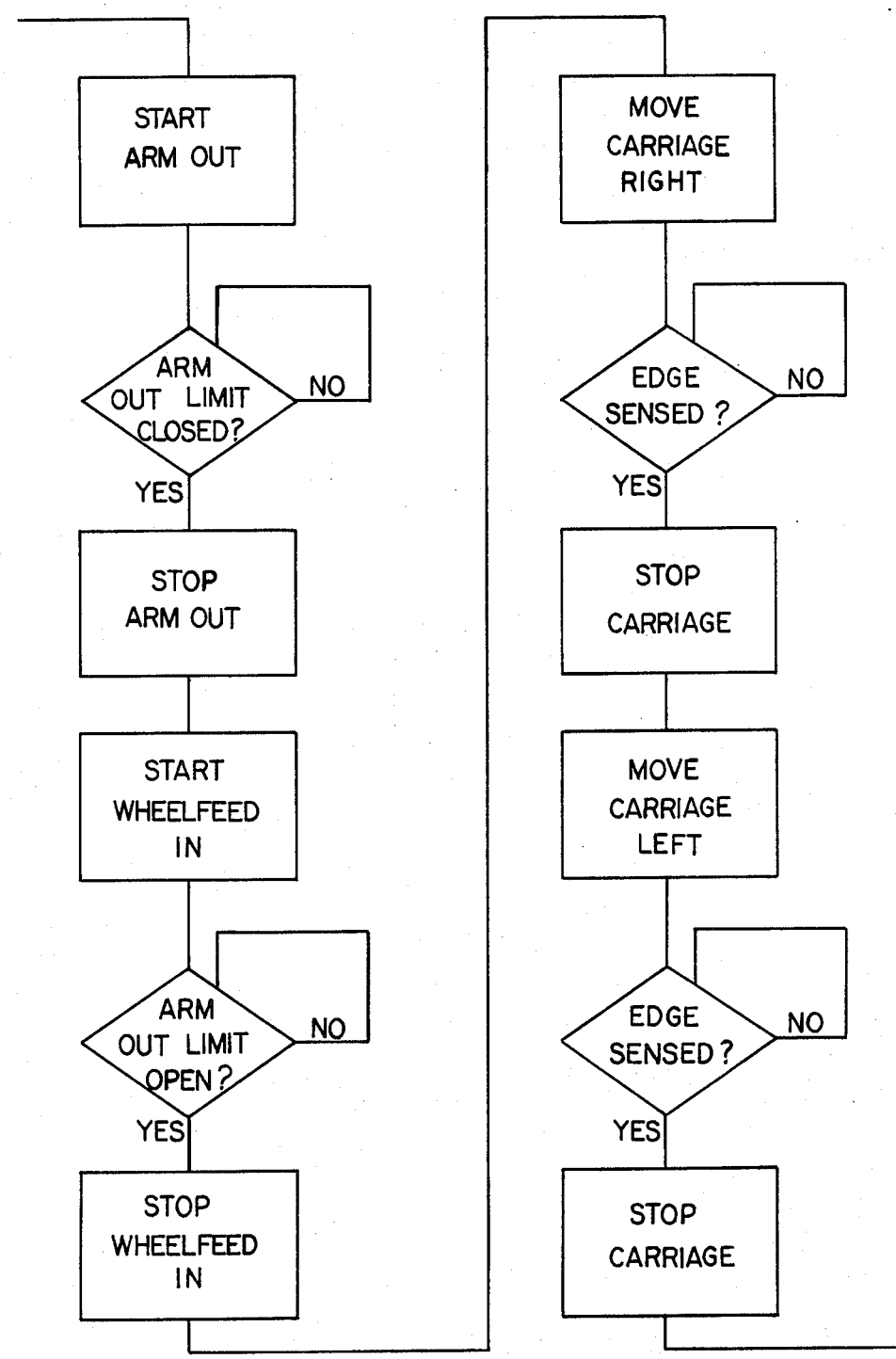
Figure 14C:
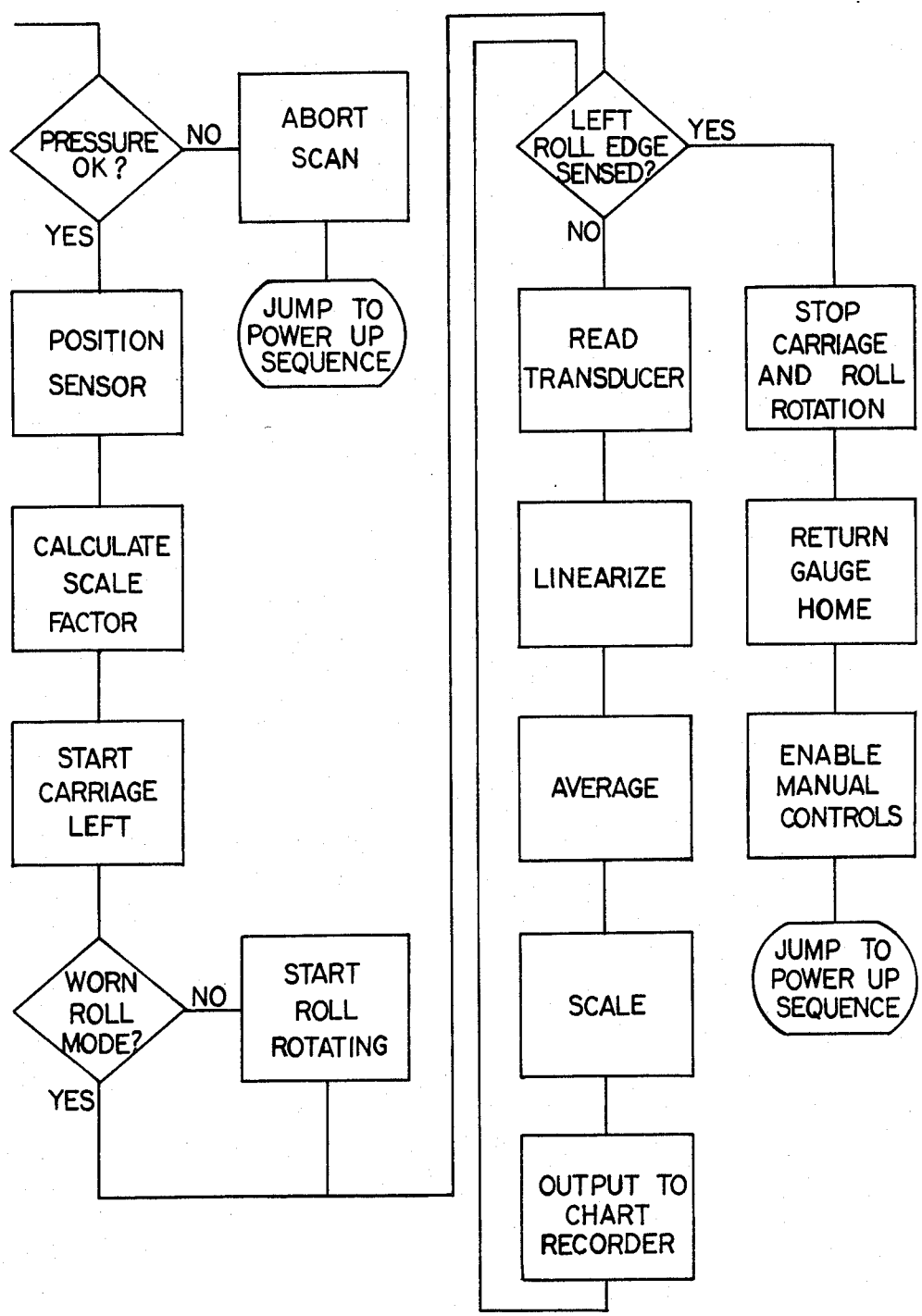

As previously indicated, the processor 120 controls movement of the mechanical components of the gauge 12, motion of the carriage 21 and grinding wheel housing 22 of the grinding wheel 20, rotation of the roll 18, the signal conditioning of the signal of the fluidic sensor 52, the control of the chart pen output of the chart recorder 118, and the sensing of some dangerous conditions and the execution of retractive moves to protect the gauge 12 from damage. FIGS. 13–14C are flow diagrams illustrating the processing of the roll profile gauge 12 by the processor 120.

A typical measuring cycle for the charting of the profile of rolls 18 is shown in FIGS. 13 through 14C. More particularly, FIG. 13 is a flow diagram showing the power-up sequence, wherein it will be seen that when the power on button of the processor 120 is depressed, means within the processor determine whether or not the gauge 12 is in the home position within its enclosure 90. If the answer is affirmative, the processor 120 then waits for a scan request.

As shown in FIG. 14A, when the scan request is given, means within the processor 120 determine whether or not the grinder 12 is being used. If the grinder 12 is being used, the scan request is ignored. However, if the grinder 12 is not being used, means within the processor 120 inhibit the grinder controls and begin the automatic cycle so that the measuring cycle is controlled by the processor 120. If the worn roll mode is selected, means within the processor set the reference voltage for gauging worn rolls. Similarly, if the ground roll mode was selected, means within the processor set the reference voltage for ground rolls.

Following setting of the reference voltage by the processor 120, means within the processor 120 actuate the traverse motor 24, causing the grinding wheel housing 22 to back away from the roll 18 until the wheel housing retract switch 132 is depressed, whereupon means within the processor 120 actuate the air cylinder equipment 110 atop the gauge enclosure 90 to open the enclosure doors 96. Next, means within the processor 120 actuate the gear motor 106 for rotating the gauge mounting arm 102 until the cam 116 mounted on the pivot 104 at the base of the gauge arm 102 depresses or closes the arm-out limit switch 114B, which removes the power from the gear motor 106. At the same time, means within the processor 120 activate the traverse motor 24, causing the grinding wheel housing 22 to advance toward the roll 18. The traverse motor 24 is stopped by the arm-out limit switch 114B when the arm 102 is lifted up on the roll 18 and the arm-out switch 114B is no longer depressed.

At this point, the gauge 12 is on the roll 18, with the weight of the arm 102 being carried partially by the double reduction chain drive system 108.

Means within the processor 120 thereupon actuate the motor 24 and move the carriage 21 for the grinding wheel housing 22 along the longitudinal bed 26 toward the head stock 14 until the proximity sensors 82 on the head stock end of the gauge head 13 sense the end of the roll 18, at which time means within the processor 120 move the gauge 12 from the head stock end 14 toward the tail stock end 16 of the roll 18 until the proximity sensors 82 (nearer the headstock 14) on the gauge head 13 are over the roll 18, and the motor 24 is deactivated.

Upon proper positioning of the gauge 12 on the roll 18 at the head stock end 14 of the roll 18, means within the processor 120 determine whether or not the fluid pressure within the tank 68 is at the desired pressure, and whether the range of allowable pressure indicated by the transducer 48 is correct. If either of the desired pressures is incorrect, the processor 120 will cause the measuring cycle to abort and return to the power up sequence shown in FIG. 13.

If the pressure readings are satisfactory, means within the processor 120 position the sensor 52 near the roll 18 by activating the stepping motor 46 until the input to the processor 120 from the sensor 52 is zero, i.e., voltage sensor equals voltage reference. Means within the processor 120 then calculate the scale factor. As previously indicated herein, the changes in the distance from the sensor 52 to the surface of the roll 18 are proportional to the changes in the roll diameter. The proportionality constant is a non-linear function of the nominal roll diameter and is calculated from the number of steps of the stepping motor 46 required to position the sensor 52. At the same time, means within the processor 120 generate an output which initially positions the pen of the chart recorder 118 in the center of the chart for the ground roll mode and at 90% of full scale for the worn roll mode.

Means within the processor 120 then actuate the motor 24 to cause the carriage 21 and the wheel housing 22 to move on the longitudinal bed 26 so that the sensor 52 traverses the roll 18 from the head stock end 14 to the tail stock end 16. Simultaneously therewith, means within the processor 120 actuate the head stock motor 33 to rotate the roll 18 if the ground roll mode had been selected.

As the sensor 52 is traversing the surface of the roll 18 from the head stock end 14 to the tail stock end 16, means within the processor 120 read the signal from the transducer 48 and measure the difference between the transducer signal and the aforementioned established reference voltage, depending upon whether the worn roll or ground roll mode was selected. Means within the processor 120 thereupon read repetitiously the signal from the transducer 48, linearize the readings, scale the readings by multiplying the linearized signal by the magnification factor calculated from the number of sensor positioning steps required, and average a plurality of the linearized and scaled readings to provide a smooth output which ignores minor variations in roll diameter.

Means within the processor 120 then generate an output signal to the chart recorder 118 to produce a chart recording which has a linear scale as the sensor 52 traverses the roll 18 from the head stock end 14 to the tail stock end 16.

Once the proximity switches 82 on the head 13 of the gauge 12 reach the end of the roll 18 at the tail stock end 16, means within the processor 120 deactivate the motor 24, which ceases movement of the carriage 21 along the longitudinal bed 26, and also deactivate the head stock motor 33, stopping rotation of the roll 18 if the processor 120 is in the ground mode.

Means within the processor 120 now cause the gauge 12 to return to its "home" position within the enclosure 90. This is accomplished by directing pulses to the stepping motor 46, which causes the sensor 52 to retract until it depresses the gauge sensor switch 86 at the rear of the gauge frame and the motion of the sensor 52 ceases. Means within the processor 120 thereupon activate the gear motor 106 within the housing 90, causing the gauge arm 102 to retract into the enclosure 90. The power to the gear motor 106 is terminated when the gauge arm 102 is within the enclosure 90, at which time the cam 116 depresses the arm-in switch 114a. When the gauge 12 has entered the enclosure 90, the clip 92 makes contact with the bracket 94 in the top of the enclosure 90, causing the gauge 12 to be pushed into an upright position so that eventually the doors 96 of the enclosure 90 may be closed without hitting the gauge 12. Simultaneously with the activation of the gear motor 106, which causes the arm 102 to be retracted within the enclosure 90, means within the processor 120 actuate the motor 28, causing the wheel housing 22 to move away from the roll 18 until the wheel housing retract switch 132 is depressed. Means within the processor 120 thereupon actuate the air cylinder equipment 110 atop the enclosure 90, closing the doors 96 to the enclosure 90.

The measuring cycle is finally completed when means within the processor 120 return full control of the roll grinder 10 to the grinder control panel 34 and the processor 120 returns to its power up sequence.

In a working embodiment of the present invention, it was found desirable to maintain the smallest possible volume of air in the bore 60 the sensor 52 and the line 78 leading to the bellows 74. This is necessary for maintaining small response times to change that the sensor 52 is detecting. The volume of the bellows 74 in the working protype was about 0.22 cubic inches (1.5 inches diameter by 0.125 inches thick). The line joining the bellows 74 and the sensor 52 was 0.125 inch outside diameter nylon tubing about one foot long. As small as this tubing was, it did not attenuate high frequency pressure changes. The dimensions of bore 60 of sensor 52 were 0.125 inch diameter by 3.5 inches long. Additionally, the working protype utilized a 20 psi supply to the orifice 62 of the sensor 52. The bore 60 operated at about 12 psi. In the working prototype, when the diameter of the roll 18 (about 26 inches in diameter, with the distance between the centers of the spherical elements being 17 inches), changed 0.001 inch, the air gap changed only 0.000154 inch. With the sensor 52 set in its mid-range or linear band of 0.003 inch air gap 70, a change of air gap from 0.0020 inch to 0.0040 inch measured a change of diameter of 0.0130 inch of crown and/or taper of the roll 18.

The present invention provides a gauge 12 which will improve the resolution, accuracy and ease of profile gauging hot and cold steel rolls and back-up rolls to improve the quality of hot and cold-rolled steel. When the teachings of the present invention are applied to gauging the surface of a ground roll, the ground roll is rotated, eliminating non-round influences in the readout.

According to the teachings of the present invention, worn rolls may be automatically measured before being reground in the roll grinder.

The roll profile gauge 12 of the present invention, because of its small size, offers advantages over the present diameter measuring devices that are machine mounted. For example, small size makes the gauge 12 easier to retrofit to existing machines (most roll grinders have useful lives of 30-40 years). The smaller gauge 12 is cheaper to produce, to install, and to maintain. The gauge 12 has no moving parts when it is measuring the change of diameter from its initial setting. Combined with the fact that the gauge 12 is small and very rigid allows the gauge 12 to perform exceptionally well in resolution and stability. These features become more important as larger sizes of rolls 18 are gauged, such as 60-inch diameter back-up rolls. Additionally, the small gauge 12 of the present invention may be stored in an enclosure 90 to protect it from shop dirt and from accidental impact during loading and unloading rolls 18.

It will be understood that various changes in the details, steps, materials and arrangements of parts may be made herein within the principle and scope of the invention as expressed in the appended claims.

What is claimed is:

1. In a conventional roll grinding apparatus of the type having a head stock and a tail stock mounting a roll to be ground, a grinding wheel mounted on a housing, means to traverse the housing longitudinally of said roll, means to shift the housing toward and away from said roll in a direction substantially perpendicular to the roll axis, and means for rotating said roll, a gauge mounted on said housing, said gauge having a sensor for continuously sensing the distance between said sensor and the roll surface as said housing traverses said roll, means to move said sensor toward and away from said roll relative to said housing, transducer means for converting said sensor output into an electric output, a chart recorder having circuitry driving a pen and an input and output, the output of said chart recorder producing a chart recording, the improvement in combination therewith comprising:

an electronic processor having inputs and outputs, an output of said transducer being connected to an input of said processor;

means within said processor that determines the diameter of roll being measured and adjusts the gain of said circuitry driving said pen of said chart recorder;

input means within said processor to read the output signal from said transducer and measure the distance between the transducer signal and an established reference voltage;

means within said processor whereupon to multiply the signal from said transducer by the magnification factor derived from the number of sensor positioning steps to move said sensor from its home position to its reference location near the surface of the roll;

means within the processor to thereupon generate an output signal to said chart recorder comprising the average of a plurality of individual signal readings to provide a smooth chart recording which ignores minor variations in roll diameters; and the output of said chart recorder producing a chart recording which has a linear scale to profile the surface of the roll traversed by said sensor;

whereby to improve the resolution, accuracy and ease of profile gauging worn and ground rolls of various diameters.

2. The grinding apparatus according to claim 1, wherein said processor serves as the master controller of said roll grinder during a measuring cycle and the measuring cycle is controlled by said processor.

3. The grinding apparatus according to claim 2, wherein said processor accepts the voltage signal created by said sensor and filters and conditions the signal before it reaches the chart recorder.

4. The grinding apparatus according to claim 3, wherein the basic diameter of the roll is measured by the distance the sensor is required to move out of said gauge head to come into its operating position near the surface of said roll.

5. The grinding apparatus according to claim 4, wherein said sensor is a fluidic sensor and is provided with an axial bore having an inlet orifice and an outlet orifice, means to supply fluid under pressure to said inlet orifice, the amount of fluid permitted to flow from said outlet orifice being governed by the distance which said outlet orifice is from the surface of said roll, said output of said sensor connecting said bore in said input of said transducer, whereby when the distance between said outlet orifice and the surface of said roll changes, the pressure in said bore changes and said pressure change will be detected by said transducer.

6. The grinding apparatus according to claim 5, wherein said means to move said sensor toward and away from said roll relative to said housing comprises a stepping motor mounted within said gauge and connected to said fluidic sensor.

7. The grinding apparatus according to claim 6, wherein the changes in the distance from said outlet orifice of said fluidic sensor to the surface of the roll are proportional to the changes in the roll diameter and the proportional constant is calculated from the nunber of steps of said stepping motor required to position said sensor in its operating position near the roll surface, and means within said processor generate an output which initially positions said chart recorder for the mode of operation.

8. The grinding apparatus according to claim 7 wherein the measuring cycle is completed, means within said processor return control to said roll grinding apparatus and said processor returns to its power-up sequence position.

9. The apparatus according to claim 8, including a V-shaped gauge head comprising a block with laterally extending frame members and a pair of V-shaped plates, said block having an axial bore within which said fluidic sensor is slidingly mounted.

10. The grinding apparatus according to claim 9, wherein said transducer means is mounted within said gauge head.

11. The grinding apparatus according to claim 10, wherein each of the forwardmost ends of said gauging head is provided with a spherical element mounted in the gauge head which is adapted to contact and slide along the surface of the roll to provide a reference location for said fluidic sensor.

12. The grinding apparatus according to claim 11, wherein said spherical elements are stationary but may be adjusted by rotation if a surface thereon becomes flat through use.

13. The grinding apparatus according to claim 12, wherein a second pair of spherical elements is mounted on said gauge head, one element of said second pair of elements being located between said fluidic sensor and each of said spherical elements and the forwardmost ends of said gauge head to allow said gauge head to accommodate various ranges of roll diameters.

14. The grinding apparatus according to claim 12, wherein a proximity sensor is provided on either side of each of said spherical elements to detect when said spherical elements are about to fall off of the surface of said roll when said gauge head is at the head stock and or tail stock end of said roll.

15. The grinding apparatus according to claim 13, wherein proximity sensors are provided on either side of each of said spherical elements to detect whether said spherical elements are about to fall off of the surface of said roll when said gauge head is at the head stock end or tail stock end of said roll.

16. The grinding apparatus according to claim 12, wherein switch means is provided in said axial bore of said block for sensing the fully retracted home position of said fluidic sensor.

17. The grinding apparatus according to claim 12, wherein spring bumpers are positioned adjacent each of said spherical elements at the forwardmost corner of said gauge head which act as protective bumpers for said spherical elements and the roll.

18. The grinding apparatus according to claim 12, wherein a weight is mounted at the bottom of said gauge head to aid in keeping said gauge head in proper position and said spherical elements of said gauge head make contact with the surface of the roll.

19. The grinding apparatus according to claim 12, wherein said guage is pivotally mounted on a gauge arm allowing said gauge to be adjusted to the desired height with respect to the center line of said roll and allowing for rotation of said gauge such that said spherical elements engage the surface of said roll and maintain the alignment of said gauge with respect to said roll during the measuring cycle.

20. The grinding apparatus according to claim 12, wherein said gauge is mounted within an enclosure on top of said grinding wheel housing to keep said gauge head clean when not in use and to protect said gauge during roll loading and unloading, and wherein a movement of the gauge is controlled by a motor mounted within said enclosure.

21. The grinding apparatus according to claim 20, wherein when said fluidic sensor has completed traversing the roll, means within said processor will cause said gauge to return to its position within said enclosure by directing pulses to said stepping motor, causing said sensor to retract until it depresses said sensor switch at the rear of said gauge head and said gear motor within said enclosure is activated, causing said gauge to retract within said enclosure.

22. The grinding apparatus according to claim 21, wherein a reduction chain drive is mounted in said enclosure for reducing the rotary speed of said gauge arm, and also including means to unload a portion of the weight of said gauge arm.

23. The grinding apparatus according to claim 22, wherein a clip is mounted adjacent said upper bumper and a mating finger is mounted inside said enclosure, and wherein said gauge begins entering said enclosures and clip makes contact with said finger, causing said gauge to be pushed into an upright position so that the doors of said enclosure may be closed without hitting said gauge.

24. The grinding apparatus according to claim 22, wherein the change of distance between the outlet orifice of said sensor and the surface of said roll is calculated according to the relationship:

$$B = \frac{D}{2} - \sqrt{\left(\frac{D}{2} + R\right)^2 - \left(\frac{A}{2}\right)^2}$$

where B equals the dimension for the depth below the surface of the roll of a line joining the centers of said two spherical elements, D equals the diameter of the roll, R equals the radius of said spherical elements, and A equals the distance of a line joining the centers of said two spherical elements.

25. The grinding apparatus according to claim 24, wherein the change in the amplification rate when different gross sizes of rolls being measured, so that the diameter of the roll influences the magnification of the signal generated from the output of said processor to the input of said chart recorder, is calculated according to the relationship:

$$\frac{d(b)}{d(D)} = \frac{1}{2}\left(1 - \frac{\frac{D}{2} + R}{\sqrt{\left(\frac{D}{2} + R\right)^2 - \left(\frac{A}{2}\right)^2}}\right)$$

where B equals the dimension for the depth below the surface of the roll of a line joining the centers of said two spherical elements, D equals the diameter of the roll, R equals the radius of said spherical elements, and A equals the distance separating a line joining the centers of said two spherical elements.

* * * * *

UNITED STATES PATENT AND TRADEMARK OFFICE
CERTIFICATE OF CORRECTION

PATENT NO. : 4,524,546
DATED : June 25, 1985
INVENTOR(S) : Bradley R. Hoover and Karl T. Bagdal It is certified that error appears in the above-identified patent and that said Letters Patent are hereby corrected as shown below:

Title page, the following should be added:

[73] ASSIGNEE: Armco Inc., Middletown, Ohio

Signed and Sealed this

Nineteenth Day of November 1985

[SEAL]

Attest:

Attesting Officer

DONALD J. QUIGG

Commissioner of Patents and Trademarks